United States Patent

Moriyama et al.

[11] Patent Number: 6,156,849
[45] Date of Patent: Dec. 5, 2000

[54] ACRYLIC ELASTOMER COMPOSITION

[75] Inventors: Iwao Moriyama; Jun Okabe, both of Kitaibaraki, Japan

[73] Assignee: Nippon Mektron, Limited, Japan

[21] Appl. No.: 09/148,298

[22] Filed: Sep. 4, 1998

[30] Foreign Application Priority Data

Sep. 19, 1997 [JP] Japan .................................. 9-273496

[51] Int. Cl.[7] .............................. C08F 22/16; C08C 19/36
[52] U.S. Cl. ...................... 525/329.5; 525/379; 525/382
[58] Field of Search .................................. 525/329.6, 379, 525/382

[56] References Cited

U.S. PATENT DOCUMENTS

| 3,335,110 | 8/1967 | Mino . |
| 3,883,472 | 5/1975 | Greene et al. . |

FOREIGN PATENT DOCUMENTS

| 0 084 784 | 8/1983 | European Pat. Off. . |
| 0 113 904 | 7/1984 | European Pat. Off. . |
| 0 701 997 | 3/1996 | European Pat. Off. . |
| 2 240 241 | 3/1975 | France . |
| 2 243 972 | 4/1975 | France . |
| 2 286 856 | 4/1976 | France . |
| 2 304 627 | 10/1976 | France . |
| 2 400 655 | 7/1974 | Germany . |
| 50-45031 | 4/1975 | Japan . |
| 6-99515 | 4/1994 | Japan . |

OTHER PUBLICATIONS

Database WPI, Section Ch, Week 8438, Derwent Publications Ltd., London, GB, Class A14, AN 80–24208C, XP002088502 & JP 55 023128 A (Nippon Oil Seal Ind. Co., Ltd.), Feb. 19, 1980 *abstract*.

*Primary Examiner*—Donald R. Wilson
*Attorney, Agent, or Firm*—Baker & Daniels

[57] ABSTRACT

An acrylic elastomer composition, which comprises an acrylic elastomer obtained by copolymerization with 0.1 to 10% by weight of fumaric acid mono-lower alkyl ester on the basis of total monomer mixture, an aromatic diamine compound vulcanizing agent and a guanidine compound vulcanization promoter is distinguished in metal corrosion resistance, oil resistance, compression set characteristics, etc. and is effectively applicable as a vulcanization molding material for seal members or hose members to be used at contact sites with metal members, oil, etc.

6 Claims, No Drawings

ACRYLIC ELASTOMER COMPOSITION

BACKGROUND OF THE INVENTION

1. Field of the Invention

The present invention relates to an acrylic elastomer composition and more particularly to an acrylic elastomer composition effectively applicable as a vulcanization molding material for seal members or hose members to be used at contact sites with a metallic member, oil, etc.

2. Description of Related Art

Automobile seal members or hose members require a metal corrosion resistance, an oil resistance, compression set characteristics, etc. and these requirements are more strict on more diversified year by year. Thus, special rubber materials are in demand. But, conventional acrylic elastomer compositions actually fail to satisfy all of these requirements.

For example, active chloride group-containing acrylic elastomers compounded with a triazine compound and a metal salt of dithiocarbamic acid have been used as rubber materials having distinguished compression set characteristics, but are not satisfactory for metal corrosion resistance-requiring uses. On the other hand, epoxy group-containing acrylic elastomers have been used in such metal corrosion resistance-requiring uses, but have not satisfied the strict metal corrosion resistance now in demand yet.

Known rubber materials containing no such active halide groups include a terpolymer of ethylene-butenedionic acid monoester-acrylic acid monoester (JP-A-50-45031), where only a terpolymer of ethylene-monomethyl maleate-methyl acrylate is disclosed concretely. As shown in Comparative Example 5 of the present specification which follows, such a terpolymer is not satisfactory for use as seal members requiring an oil resistance such as packings, gaskets, etc.

Furthermore, JP-A-7-33410 discloses that acrylic elastomers copolymerized with fumaric acid monoalkyl ester can give cross-linked products having good alkali resistance and oil resistance, where only hexamethylenediamine carbamate, N,N'-dicinnamylidene-1,6-hexanediamine and 4,4'-methylene bis(cyclohexylamine)carbamate are exemplified as a vulcanizing agent. Actually used therein is only hexamethylenediamine carbamate and the resulting cross-linked products have not better compression set characteristics. No reference is made to the metal corrosion resistance.

Furthermore, JP-A-6-99515 discloses that acrylic elastomers copolymerized with maleic acid monoalkyl ester are not satisfactory in the compression set characteristics.

Metal members, particularly iron or aluminum members are much used as automobile members. Iron members include cast irons such as FC, FCD, etc., carbon steel cast irons such as SC, etc., structural alloy steels such as SCr, SCM, SNCM, etc., heat-resisting steel such as SUH, etc. and so on. Aluminum members include alloys with a corrosion resistance-improving metal such as Cu, Si, Zn, etc., for example, alloys used mainly as high strength alloys (for structural purpose), heat-resisting alloy, etc. upon various plating treatment for corrosion resistance.

However, even these plated metal members are not satisfactory in the metal corrosion resistance yet. Plating layers may be damaged due to erosion through pinholes, cracks, etc. or due to acidic substances generated from the vulcanized rubber during the long-term service, resulting in decrease in the corrosion-preventing effect. Thus, the vulcanized rubber requires a metal corrosion resistance, and when it is used in the automobile engine room and exposed to high temperatures (about 150° C.), metal corrosion may be further accelerated.

Seal members or hose members are often used in contact with both air and oil and thus are much susceptible to deterioration of rubber components due to additives, etc. presented in oil such as engine oil, AFT oil, gear oil, etc., or to oxidative deterioration at high temperatures on the air side. Thus, the molding materials must have good resistances to these two deteriorations.

SUMMARY OF THE INVENTION

An object of the present invention is to provide a fumaric acid monoalkyl ester-containing acrylic elastomer composition having distinguished metal corrosion resistance, oil resistance, compression set characteristics, etc. and effective applicable as a vulcanization molding material for seal members or hose members to be used at contact site with metal members, oil, etc.

The object of the present invention can be attained by an acrylic elastomer composition, which comprises an acrylic elastomer obtained by copolymerization reaction with 0.1 to 10% by weight of fumaric aid mono-lower alkyl ester having a lower alkyl group having 1 to 5 carbon atoms on the basis of total monomer mixtures, an aromatic diamine compound vulcanizing agent and a guanidine compound vulcanization promoter.

DETAILED DESCRIPTION OF THE INVENTION

Acrylic elastomers obtained by copolymerization with 0.1 to 10% by weight of fumaric acid mono-lower alkyl ester can be obtained by copolymerization by charging 0.1 to 10% by weight, preferably 0.5 to 7% by weight, more preferably 1 to 5% by weight, of fumaric acid monoester having a lower alkyl having 1 to 5 carbon atoms such as methyl, ethyl, propyl, isopropyl, n-butyl, etc. on the basis of total monomer mixture. Since the polymerization yield can reach about 90% or more, the proportion of fumaric acid mono-lower alkyl ester can take approximately a proportion thereof in the resulting copolymer.

The fumaric acid mono-lower alkyl ester can be copolymerized with at least one of an alkyl acrylate and an alkoxyalkyl acrylate as main comonomer components. Alkyl acrylate for use in the copolymerization includes alkyl acrylates having an alkyl group having 1 to 8 carbon atoms, such as methyl acrylate, ethyl acrylate, propyl acrylate, isopropyl acrylate, n-butyl acrylate, n-hexyl acrylate, 2-ethylhexyl acrylate, n-octyl acrylate, etc., among which ethyl acrylate and n-butyl acrylate are preferable from the viewpoint of a good balance between the oil resistance and the cold resistance. Generally, an alkyl group with a longer chain can be effective for the cold resistance, and not for the oil resistance, whereas an alkyl group with a shorter chain can act in reverse.

Alkoxyalkyl acrylate for use in the copolymerization includes alkoxyalkyl acrylates having an alkoxyalkyl group having 2 to 8 carbon atoms, such as methoxymethyl acrylate, 2-methoxyethyl acrylate, 2-ethoxyethyl acrylate, 2-butoxyethyl acrylate, 2- or 3-ethoxypropyl acrylate, etc., among which 2-methoxyethyl acrylate and 2-ethoxyethyl acrylate are preferable. These alkoxyalkyl acrylates have an ether group as a side chain and thus have a good balance between the cold resistance and the oil resistance.

A larger copolymerization proportion of alkoxyalkyl acrylate will deteriorate the heat resistance and normal state physical properties, and thus about 70 to about 9.9% by weight, preferably about 60 to about 20% by weight, of alkoxyalkyl acrylate can be used in the polymerization reaction on the basis of total monomer mixture, whereas about 30 to about 90% by weight, preferably about 40 to about 80% by weight, of alkyl acrylate can be used in the copolymerization reaction on the basis of total monomer mixture.

Fumaric acid mono-lower alkyl ester-containing acrylic elastomer can be further copolymerized with other vinyl or olefinic monomer within such a range as not to inhibit the characteristics (for example, not more than about 30% by weight on the basis of total monomer mixture). Such other vinyl or olefinic monomer includes, for example, styrene, vinyl toluene, α-methylstyrene, vinylnaphthalene, acrylonitrile, methacronitrile, acrylamide, vinyl acetate, cyclohexyl acrylate, benzyl acrylate, 2-hydroxyethyl acrylate, 4-hydroxybutyl acrylate, piperylene, butadiene, isoprene, pentadiene, etc.

Furthermore, to improve the kneading processability, extrusion processability, etc., not more than about 1% by weight on the basis of total monomer mixture of a polyfunctional unsaturated monomer or oligomer can be used in the copolymerization reaction, if necessary. Such polyfunctional unsaturated monomer or oligomer includes, for example, ethyleneglycol di(meth)acrylate, propyleneglycol di(meth)acrylate, 1,4-butanediol di(meth)acrylate, 1,6-hexanediol di(meth)acrylarte, 1,9-nonanediol di(meth)acrylate, neopentylglycol di(meth) acrylate, tetraethyleneglycol di(meth)acrylate, tripropylenglycol di(meth)acrylate, ethylene oxide adduct diacrylate of bisphenol A, dimethyloltricyclodecane diacrylate, glycerine dimethacrylate, 3-acryloyloxyglycerine monomethacrylate, etc.

The fumaric acid mono-lower alkyl ester-containing acrylic elastomer comprising these comonomer components can be admixed with an aromatic diamine compound vulcanizing agent and a guanidine compound vulanization promoter.

Aromatic diamine compound for use in the present acrylic elastomer composition includes, for example, 4,4'-methylenedianiline, m-phenylenediamine, 4,4'-diaminodiphenyl ether, p-phenylenediamine, p,p'-ethylenedianiline, 4,4'-(p-phenylenediisopropylidene) dianiline, 4,4'-(m-phenylenediisopropylidene)dianiline, 3,4'-diaminodiphenyl ether, 4,4'-diaminodiphenylsulfone, 2,2-bis[4-(4-aminophenoxy)phenyl]propane, bis[4-(4-aminophenoxy)phenyl]sulfone, bis[4-(3-aminophenoxy) phenyl]sulfone, 4,4'-bis(4-aminophenoxy) biphenol, bis[4-(4-aminophenoxy) phenyl]ether, 2,2-bis[4-(4-aminophenoxy) phenyl]hexafluoropropane, 1,4-bis(4-aminophenoxy)-benzene, 1,3-bis(4-aminophenoxy) benzene, etc., among which p-diamino substituted compounds are preferable. The aromatic diamine compound can be used in an amount of about 0.1 to about 5 parts by weight, preferably about 0.2 to about 4 parts by weight, more preferably about 0.5 to about 3 parts by weight, per 100 parts by weight of the fumaric acid mono-lower alkyl ester-containing acrylic elastomer. Below about 0.1 parts by weight, vulcanization will not be satisfactory and no satisfactory compression set characteristics can be obtained, whereas above about 5 parts by weight scorching will occur with a failure of vulcanization. When an aliphatic diamine compound or an alicyclic diamine compound is used, scorching will more readily occur and the processing stability will be hard to obtain.

Guanidine compound for use in the present acrylic elastomer composition includes, besides guanidine, diphenylguanidine, tetramethylguanidine, tetraethylguanidine, di-o-tolylguanidine, 1-o-tolylbiguanide, di-o-tolylguanidine salt of dicatechol borate, etc., among which diphenylguanidine and di-o-tolylguanidine are preferable. The guanidine compound can be used in an amount of about 0.1 to about 10 parts by weight, preferably about 0.3 to about 6 parts by weight, more preferably about 0.5 to about 4 parts by weight, per 100 parts by weight of the fumaric acid mono-lower alkyl ester-containing acrylic elastomer. Below about 0.1 part by weight the vulcanization speed will be retarded and it will take a longer time in the secondary vulcanization, and thus this is not practical, whereas above about 10 parts by weight the vulcanization will be inhibited and no satisfactory compression set characteristics can be obtained. In case other vulcanization promoters than guanidine are used, any satisfactory compression set characteristics can be no more obtained The acrylic elastomer composition comprising the foregoing components as essential ones can be further admixed with a reinforcing agent, a filler, an antioxidant, a stabilizer, a plasticizer, a lubricant, a processing aid, etc., if necessary. The composition can be prepared by a mixer such as an open roll, Banbury mixer, a kneader, etc. The thus prepared composition can be vulcanized through press vulcanization at about 150° to about 200° C. for about 1 to about 30 minutes and oven vulcanization (secondary vulcanization) at about 150° to about 180° C. for about 2 to about 16 hours. Its vulcanization molding can be carried out by compression molding, injection molding, transfer molding, etc.

The thus obtained vulcanization products can be effective applied as seal members or hose members to be used at contact sites with metal members, oil, etc.

The present acrylic elastomer composition is distinguished particularly in the compression set characteristics and also distinguished in the metal corrosion resistance, particularly in the metal corrosion resistance at high temperatures, and the oil resistance, and thus can be effectively applied as a vulcanization molding material for seal members or hose members to be used at contact sites with metal members, oil, etc.

PREFERRED EMBODIMENTS OF THE INVENTION

The present invention will be described in detail below, referring to Examples.

REFERENCE EXAMPLE

Into a separable flask with a thermometer, a stirrer, a nitrogen gas inlet tube and a pressure-reducing means were charged 150 parts by weight of water, 5.5 parts by weight of sodium laurylsulfate and 100 parts by weight of monomer mixture shown in the following Tables 1 and 2. After complete removal of oxygen from the system by repetition of degasification and nitrogen gas flushing, 0.002 parts by weight of sodium formaldehyde sulfoxylate and 0.005 parts by weight of tert.-butyl hydroperoxide were added thereto to initiate polymerization reaction at room temperature. The polymerization reaction was continued until the polymerization conversion reached to 90%. The resulting aqueous latex was coagulated in an aqueous sodium chloride solution, followed by water washing and drying, whereby fumaric acid monoester-containing acrylic elastomers A~M, Q, R, maleic acid monoester-containing acrylic elastomer P, active chlorine-containing acrylic elastomer S and epoxy group-containing acrylic elastomer T were obtained:

TABLE 1

| Monomer (parts by weight) | A | B | C | D | E | F | G | H | I | J | K | L | M |
|---|---|---|---|---|---|---|---|---|---|---|---|---|---|
| EA | 25.2 | 45 | 45 | 46 | 46 | 46 | | 65.5 | 10 | 30 | 40 | 41 | 45 |
| BA | 45 | 30 | 30 | 30 | 30 | 30 | 47.5 | 32 | 52.0 | | 33 | 33 | 31 |
| MEA | 28 | 22.5 | 19 | 20 | 23 | 20 | 50 | | 35 | 67 | 20 | 20 | 22.5 |
| St | | | | | | | | | | | | 3 | |
| AN | | | | | | | | | | | 4 | | |
| NPGDA | | | | | | 0.1 | | | | | | | |
| MF | 1.8 | | | | | | | | | | | | |
| EF | | | 6 | 4 | 1 | 4 | | | | | 3 | 3 | 1.5 |
| BF | | 2.5 | | | | | 2.5 | 2.5 | 2.5 | 3 | | | |

TABLE 2

| Monomer (parts by weight) | P | Q | R | S | T |
|---|---|---|---|---|---|
| EA | 46 | 45 | 45 | 37.5 | 45 |
| BA | 30 | 30 | 30 | 30 | 30 |
| MEA | 20 | 14 | 24.92 | 30 | 22 |
| EF | | 11 | 0.08 | | |
| BM | 4 | | | | |
| AGE | | | | | 3 |
| CVA | | | | 2.5 | |

Note)
EA: Ethyl acrylate
BA: n-Butyl acrylate
MEA: 2-Methoxyethyl acrylate
St: Styrene
AN: Acrylonitrile
NPGDA: Neopentylglycol diacrylate
MF: Monomethyl fumarate
EF: Monoethyl fumarate
BF: Mono-n-butyl fumarate
BM: Mono-n-butyl maleate
AGE: Allyl glycidyl ether
CVA: Chlorovinyl acetate

EXAMPLES 1 TO 12

To 100 parts by weight of each of fumaric acid monoester-containing acryl elastomers A to L prepared in Reference Examples were added the following compounds to prepare corresponding acrylic elastomer compositions to Examples 1 to 12, respectively:

| | |
|---|---|
| Stearic acid | 1 parts by weight |
| 4,4'-Bis(α,α-dimethylbenzyl) diphenylamine | 2 parts by weight |
| HAF carbon black | 50 parts by weight (for Examples 1 and 2) |
| | 60 parts by weight (for Examples 3 to 6) |
| | 65 parts by weight (for Examples 7 to 12) |
| 4,4'-diaminodiphenyl ether | 1 part by weight |
| Di-o-tolylguanidine | 3.5 parts by weight |

The resulting mixtures were kneaded in an open roll, and the resulting kneaded mixtures were subjected to press vulcanization at 180° C. for 8 minutes and then to secondary vulcanization in a gear oven at 175° C. for 4 hours.

The resulting vulcanization products were tested for the following items.

Compression set: According to JIS K-6301 (150° C. for 70 hours)

Heat aging resistance: Changes in the normal state physical properties after being kept in a gear oven at 175° C. for 70 hours Cold resistance: TR-10 value Oil resistance: Percent volume change after being kept in JIS No.3 oil, engine oil (Toyota SG 10W-30) or ATF oil (Honda Ultra ATF) at 150° C. for 70 hours Metal corrosion resistance: SC steel plate or Al—Si alloy plate was subjected as a contamination-susceptible material to an accerated test at a temperature of 40° C. and a relative humidity of 95% RH for one week according to contact contamination test, and corroded area proportion was classified into 6 levels: level 0 (0-less than 1%), level 1 (1 to less than 5%), level 2 (5 to less than 10%), level 3 (10 to less than 20%), level 4 (20 to less than 30%) and level 5 (30% or more) to judge the presence of corrosion The results are shown in the following Table 3:

TABLE 3

| Items | | Example No. 1 | 2 | 3 | 4 | 5 | 6 | 7 | 8 | 9 | 10 | 11 | 12 |
|---|---|---|---|---|---|---|---|---|---|---|---|---|---|
| Compression set | (%) | 9 | 9 | 13 | 12 | 19 | 13 | 8 | 8 | 6 | 6 | 12 | 11 |
| Heat aging resistance | | | | | | | | | | | | | |
| Hardness change | (pts) | +1 | +1 | +1 | +7 | +4 | +5 | +4 | −2 | −1 | +5 | +6 | +2 |
| Tensile strength change | (%) | −6 | −20 | −23 | −13 | −17 | −11 | −7 | −13 | −10 | −8 | −10 | −8 |
| Elongation change | (%) | +10 | +14 | +10 | +6 | +4 | 0 | 0 | +18 | 0 | 0 | +11 | +3 |
| Cold resistance | (° C.) | −31.2 | −31.2 | −26.4 | −25.3 | −26.6 | −25.5 | −36.8 | −22.9 | −35.2 | −25.6 | −20.2 | −26.3 |
| Oil resistance | | | | | | | | | | | | | |
| JIS3 oil | (%) | 27.1 | 21.6 | 22.0 | 21.8 | 21.7 | 21.2 | 23.7 | 26.1 | 28.9 | 8.1 | 16.5 | 20.2 |
| Engine oil | (%) | 8.1 | 6.4 | 6.5 | 6.4 | 6.4 | 6.2 | 7.0 | 7.8 | 8.7 | 2.0 | 4.7 | 5.9 |

TABLE 3-continued

| | | Example No. | | | | | | | | | | | |
|---|---|---|---|---|---|---|---|---|---|---|---|---|---|
| Items | | 1 | 2 | 3 | 4 | 5 | 6 | 7 | 8 | 9 | 10 | 11 | 12 |
| ATF oil | (%) | 13.6 | 10.8 | 11.0 | 10.9 | 10.9 | 10.6 | 11.9 | 13.1 | 14.5 | 4.1 | 8.3 | 10.1 |
| Metal corrosion resistance | | | | | | | | | | | | | |
| SC steel plate | | 0 | 0 | 0 | 0 | 0 | 0 | 0 | 0 | 0 | 0 | 0 | 0 |
| AL—Si alloy steel | | 1 | 1 | 1 | 1 | 1 | 1 | 1 | 1 | 1 | 1 | 1 | 1 |
| Presence of corrosion | | None | None | None | None | None | None | None | None | None | None | None | None |
| Acrylic elastomer used | | A | B | C | D | E | F | G | H | I | J | K | L |

COMPARATIVE EXAMPLES 1 TO 3

In Example 3, maleic acid monoester-containing acrylic elastomer P or fumaric acid monoester-containing acrylic elastomers Q, R were used in the same amounts in place of the fumaric acid monoester-containing elastomer C to Comparative Examples 1, 2 and 3, respectively. In Comparative Example 2 using the fumaric acid monoester-containing acrylic elastomer Q, molding failed to proceed due to the scorching.

COMPARATIVE EXAMPLES 4 TO 6

The following components as shown in Table 4 were kneaded and vulcanized in the same manner as in Example 1 to obtain vulcanization products.

TABLE 4

| | Comp. Ex. (parts By weight) | | |
|---|---|---|---|
| Components | 4 | 5 | 6 |
| Active Chlorine-containing acrylic elastomer S | 100 | | |
| Vamac HG (product commercially available from DuPont, USA) | | 100 | |
| Epoxy group-containing acrylic elastomer T | | | 100 |
| Stearic acid | 1 | 2 | 1 |
| 4,4'-Bis(α,α-dimethylbenzyl) diphenylamine | 2 | 2 | 2 |
| HAF carbon black | | 45 | 65 |
| FEF carbon black | 60 | | |
| 4,4'-Diaminodiphenyl ether | | 1.25 | |
| Di-o-tolylguanidine | | 4 | |
| 2,4,6-Trimercapto-s-triazine | 0.5 | | |
| Zinc dibutylthiocarbamate | 1.5 | | |
| Ammonium benzoate | | | 2 |

Vulcanization products obtained in Comparative Examples 1,3 and 4 to 6 were tested for the same items in the same manner as in Example 1 and the results are shown in the following Table 5:

TABLE 5

| | | Comp. Ex. | | | | |
|---|---|---|---|---|---|---|
| Items | | 1 | 3 | 4 | 5 | 6 |
| Compression set | (%) | 22 | 85 | 15 | 14 | 35 |
| Heat aging resistance | | | | | | |
| Hardness change | (pts) | +8 | −1 | +5 | +3 | |
| Tensile strength change | (%) | −12 | −35 | +5 | −10 | |
| Elongation change | (%) | +12 | −12 | 0 | −21 | |
| Cold resistance | (° C.) | −25.1 | −20.3 | −27.8 | −28.0 | |

TABLE 5-continued

| | | Comp. Ex. | | | | |
|---|---|---|---|---|---|---|
| Items | | 1 | 3 | 4 | 5 | 6 |
| Oil resistance | | | | | | |
| JIS3 oil | (%) | 22.0 | 31.5 | 22.2 | 65.2 | 21.3 |
| Engine oil | (%) | 6.5 | 9.6 | 6.6 | 20.8 | 6.3 |
| ATF oil | (%) | 11.0 | 15.8 | 11.1 | 32.6 | 10.7 |
| Metal corrosion resistance | | | | | | |
| SC steel plate | | 0 | 0 | 5 | 0 | 3 |
| Al—Si alloy plate | | 1 | 1 | 5 | 1 | 4 |
| Presence of corrosion | | None | None | Remarkable | None | Yes |

EXAMPLES 13 TO 17

The following components were kneaded and vulcanized in the same manner as in Example 1 to obtain vulcanization products:

| | |
|---|---|
| Fumaric acid monoester-containing acrylic Elastomer M | 100 parts by weight |
| Stearic acid | 1 part by weight |
| 4,4'-Bis(α,α-dimethylbenzyl) diphenylamine | 2 parts by weight |
| HAF carbon black | 60 parts by weight |
| Di-o-tolylguanidine | 2 parts by weight |
| 4,4'-Diaminodiphenyl ether | 0.7 parts by weight (for Ex. 13) |
| p,p'-Ethylenedianiline | 0.8 parts by weight (for Ex. 14) |
| 2,2-Bis[4-(4-aminophenoxy)phenyl] hexafluoropropane | 2 parts by weight (for Ex. 15) |
| 4,4'-(p-Phenylenediisopropylidene) dianiline | 1.2 parts by weight (for Ex. 16) |
| 4,4'-(m-Phenylenediisopropylidene) dianiline | 1.2 parts by weight (for Ex. 17) |

EXAMPLE 18

In Example 13, the amount of 4,4'-diaminodiphenyl ether was changed to 1 part by weight.

EXAMPLE 19

In Example 18, 3.9 parts by weight of di-o-tolylguanidine salt of dicatechol borate was used in place of di-o-tolylguanidine.

Vulcanization products obtained in Examples 13 to 19 were tested for the same items in the same manner as in Example 1, and the results are shown in the following Table 6:

TABLE 6

| Items | | 13 | 14 | 15 | 16 | 17 | 18 | 19 |
|---|---|---|---|---|---|---|---|---|
| Compression set | (%) | 15 | 14 | 18 | 12 | 13 | 15 | 17 |
| Heat aging resistance | | | | | | | | |
| Hardness change | (pts) | +2 | +2 | +2 | −1 | +8 | +5 | +9 |
| Tensile strength change | (%) | −12 | −14 | −8 | −15 | −12 | −11 | −9 |
| Elongation change | (%) | +6 | +10 | 0 | +5 | +6 | +22 | −14 |
| Cold resistance | (° C.) | −26.8 | −26.5 | −26.8 | −26.6 | −26.6 | −27.1 | −26.5 |
| Oil resistance | | | | | | | | |
| JIS3 oil | (%) | 22.8 | 23.0 | 22.9 | 23.1 | 23.3 | 22.3 | 22.6 |
| Engine oil | (%) | 6.8 | 6.8 | 6.8 | 6.9 | 6.9 | 6.6 | 6.7 |
| ATF oil | (%) | 11.4 | 11.5 | 11.5 | 11.6 | 11.7 | 11.2 | 11.3 |
| Metal corrosion resistance | | | | | | | | |
| SC steel plate | | 0 | 0 | 0 | 0 | 0 | 0 | 0 |
| Al—Si alloy plate | | 1 | 1 | 1 | 1 | 1 | 1 | 1 |
| Presence of corrosion | | None | None | None | None | None | None | None |

COMPARATIVE EXAMPLES 7 AND 8

The following Compounds were kneaded and vulcanized in the same manner as in Example 1:

| | |
|---|---|
| Fumaric acid monoester-containing acrylic elastomer M | 100 parts by weight |
| Stearic acid | 1 part by weight |
| 4,4'-Bis(α,α-dimethylenzyl) diphenylamine | 2 parts by weight |
| HAF carbon black | 60 parts by weight |
| Hexamethylenediamine carbamate | 1 part by weight (for Comp. Ex.7) |
| N,N'-Dicinnamylidene-1,6-hexanediamine | 1 part by weight |

COMPARATIVE EXAMPLE 9

In Comparative Example 7, 4 parts by weight of di-o-tolylguanidine was further used.

COMPARATIVE EXAMPLES 10 TO 12

In Comparative Example 18, 2.1 parts by weight of N-oxyethylene-2-benzothiazolylsulfenamide (Comp. Ex. 10), 2.5 parts by weight of tetraethylthiuram disulfide (Comp. Ex. 11) or 4 parts by weight of zinc dibutyldithiocarbamate (Comp. Ex. 12) was used in place of di-o-tolylguanidine.

Vulcanization products obtained in Comparative Examples 7 to 12 were tested for the same items in the same manner as in Example 1, and the results are shown in the following Table 7:

TABLE 7

| Items | | 7 | 8 | 9 | 10 | 11 | 12 |
|---|---|---|---|---|---|---|---|
| Compression set | (%) | 49 | 25 | 30 | 19 | 22 | 27 |
| Heat aging resistance | | | | | | | |
| Hardness change | (pts) | +2 | 0 | +2 | +16 | +10 | +10 |
| Tensile strength change | (%) | −24 | −82 | −23 | −15 | −15 | −15 |
| Elongation change | (%) | −5 | +21 | −8 | −18 | 0 | −17 |
| Cold resistance | (° C.) | −26.9 | −22.1 | −24.9 | −26.2 | −26.9 | −27.0 |
| Oil resistance | | | | | | | | |
| JIS3 oil | (%) | 22.5 | 24.6 | 21.9 | 22.5 | 22.6 | 22.8 |
| Engine oil | (%) | 6.7 | 7.3 | 6.5 | 6.7 | 6.7 | 6.8 |
| ATF oil | (%) | 11.3 | 12.3 | 11.0 | 11.3 | 11.3 | 11.4 |
| Metal corrosion resistance | | | | | | | |
| SC steel plate | | 0 | 0 | 0 | 0 | 0 | 0 |
| Al—Si alloy plate | | 1 | 1 | 1 | 1 | 1 | 1 |
| Presence of corrosion | | None | None | None | None | None | None |

It can be concluded from the foregoing results that:

(1) Compression set characteristics are not better in Comparative Example 1 using maleic acid monoester than in Example 4 using fumaric acid monoester, (2) Metal corrosion resistance is poor in Comparative Example 4 using active chlorine-containing acrylic elastomer, (3) Acrylic elastomer composition using Vamac HG disclosed in JP-A-50-45031 has a poor oil resistance as shown in Comparative Example 5, (4) Metal corrosion resistance is poor in Comparative Example 6 using epoxy group-containing acrylic elastomer, (5) Comparison of Examples 3 to 5 showing copolymerization of fumaric acid monoester in the specified range with Comparative Examples 2 to 3 showing the copolymerization outside the specified range reveals that particularly compression set characteristics are poor in Comparative Example 3 showing too smaller copolymerization proportion of fumaric acid monoester, whereas scorching occurs to cause no molding in Comparative Example 2 showing too larger a copolymerization proportion, (6) Compression set characteristics are poor in Comparative Examples 7 to 9 using an aliphatic diamine compound as a vulcanizing agent, (7) Compression set characteristics are poor in Comparative Examples 10 to 12 using other compounds than the guanidine compound as a vulcanization promoter, and (8) The present acrylic elastomer compositions, on the other hand, are all distinguished in the metal corrosion resistance, the oil resistance, the compression set characteristics, etc.

What is claimed is:

1. An acrylic elastomer composition, which comprises an acrylic elastomer obtained by copolymerization of at least one alkyl acrylate having an alkyl group having 1 to 8 carbon atoms or alkoxy acrylate having an alkoxyalkyl group having 2 to 8 carbon atoms, with 0.1 to 10% by weight of the total monomer mixture of a fumaric acid mono-lower alkyl ester having a lower alkyl group having 1 to 5 carbon atoms, an aromatic diamine compound vulcanizing agent and a guanidine compound vulcanization promoter.

2. An acrylic elastomer composition according to claim 1, wherein the fumaric acid mono-lower alkyl ester-containing acrylic elastomer is a copolymer obtained by copolymerization of : (a) 30 to 90% by weight of an alkyl acrylate having an alkyl group having 1 to 8 carbon atoms, (b) 9.9 to 70% by weight of an alkoxyalkyl acrylate having an alkoxyalkyl group having 2 to 8 carbon atoms, (c) 0.1 to 10% by weight of a fumaric acid mono-lower alkyl ester having a lower alkyl group having 1 to 5 carbon atoms and (d) 0 to 30% by weight of a vinyl or olefinic monomer copolymerizable therewith, sum total being 100% by weight.

3. An acrylic elastomer composition according to claim 1, wherein the aromatic diamine compound vulcanizing agent is used in an amount of 0.1 to 5 parts by weight per 100 parts by weight of the acrylic elastomer.

4. An acrylic elastomer composition according to claim 1, wherein the guanidine compound vulcanization promoter is used in an amount of 0.1 to 10 parts by weight per 100 parts by weight of the acrylic elastomer.

5. An acrylic elastomer composition according to claim 1 for use as a vulcanization molding material for seal members or hose members to be used at contact sites with a metal member.

6. An acrylic elastomer composition according to claim 1 for use as a vulcanization molding material for seal members or hose members to be used at contact sites with oil.

* * * * *